(12) United States Patent
Wallwork

(10) Patent No.: US 10,080,417 B2
(45) Date of Patent: Sep. 25, 2018

(54) CONTAINER

(71) Applicant: Louise Wallwork, Northwood (AU)

(72) Inventor: Louise Wallwork, Northwood (AU)

( * ) Notice: Subject to any disclaimer, the term of this patent is extended or adjusted under 35 U.S.C. 154(b) by 0 days.

(21) Appl. No.: 14/351,744

(22) PCT Filed: Oct. 15, 2012

(86) PCT No.: PCT/AU2012/001234
§ 371 (c)(1),
(2) Date: Apr. 14, 2014

(87) PCT Pub. No.: WO2013/053009
PCT Pub. Date: Apr. 18, 2013

(65) Prior Publication Data
US 2014/0238892 A1    Aug. 28, 2014

(30) Foreign Application Priority Data

Oct. 14, 2011  (AU) ................................ 2011904229

(51) Int. Cl.
*B65D 69/00*    (2006.01)
*A45D 44/00*    (2006.01)
(Continued)

(52) U.S. Cl.
CPC ......... *A45D 44/00* (2013.01); *B65D 83/0876* (2013.01); *B65F 1/00* (2013.01);
(Continued)

(58) Field of Classification Search
CPC ................ A45D 44/00; A45D 2200/05; B65D 83/0876; B65F 1/00; B65F 1/0006;
(Continued)

(56) References Cited

U.S. PATENT DOCUMENTS 2,667,906 A  *  2/1954  Stiller ................... B29C 39/003
                                                       150/150
4,587,066 A       5/1986  Rodriguez
(Continued)

FOREIGN PATENT DOCUMENTS

EP          2 368 533 B1     9/2011
WO       2013-053009 A1      4/2013

OTHER PUBLICATIONS

International Search Report of PCT/AU2012/01234 dated Nov. 26, 2012, 4 pages.

*Primary Examiner* — Anthony Stashick
*Assistant Examiner* — James M Van Buskirk
(74) *Attorney, Agent, or Firm* — Kilpatrick Townsend & Stockton

(57) ABSTRACT

A container (10) comprising a body (11) having an internal container space (18) and an opening (14), the opening (14) being biased to a substantially closed configuration, at least opposing sections (12, 13) of the container (10) being resiliently biased towards each other to minimize the volume of the internal container space (18), wherein a user can insert at least one item into the container space (18) through the opening (14) in use by temporary deformation of at least a portion of the container (10), and the resilient bias of the at least opposing sections (12, 13) of the container (10) can apply a compressive force in use to the at least one item received in the container space (18).

11 Claims, 14 Drawing Sheets

(51) Int. Cl.
    *B65D 83/08*     (2006.01)
    *B65F 1/00*     (2006.01)
    *B65F 1/02*     (2006.01)
    *B65F 1/04*     (2006.01)
    *B65F 1/16*     (2006.01)

(52) U.S. Cl.
    CPC ............ *A45C 2200/05* (2013.01); *B65F 1/002* (2013.01); *B65F 1/0006* (2013.01); *B65F 1/02* (2013.01); *B65F 1/04* (2013.01); *B65F 1/1607* (2013.01); *B65F 2220/1066* (2013.01); *B65F 2240/132* (2013.01); *B65F 2240/1566* (2013.01); *B65F 2250/105* (2013.01); *Y02W 30/64* (2015.05)

(58) Field of Classification Search
    CPC .. B65F 1/02; B65F 1/04; B65F 1/1607; B65F 1/002; B65F 2250/105; B65F 2220/1066; B65F 2240/132; B65F 2240/1566; Y02W 30/64; A45C 13/02
    USPC .................. 206/581; 220/315, 29; 53/473; 150/151, 900
    See application file for complete search history.

(56) References Cited

U.S. PATENT DOCUMENTS

| | | |
|---|---|---|
| 4,784,497 A | 11/1988 | Dutton |
| 4,884,717 A * | 12/1989 | Bussard ................ B65D 47/06 220/229 |
| 5,285,913 A * | 2/1994 | Morton ................ B65D 41/045 215/349 |
| 5,687,839 A * | 11/1997 | Gnau, III ............. A61B 50/362 206/204 |
| 6,705,575 B1 | 3/2004 | Hoy |
| 2008/0118188 A1 | 5/2008 | Jones |

* cited by examiner

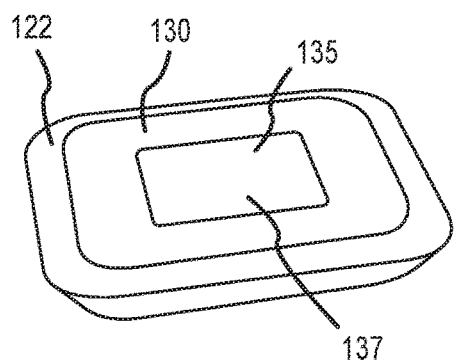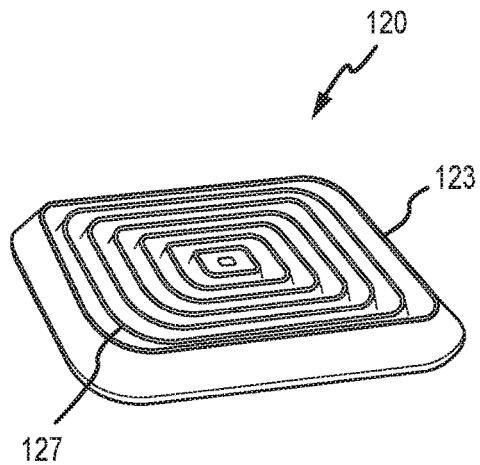
FIGURE 12a    FIGURE 12b
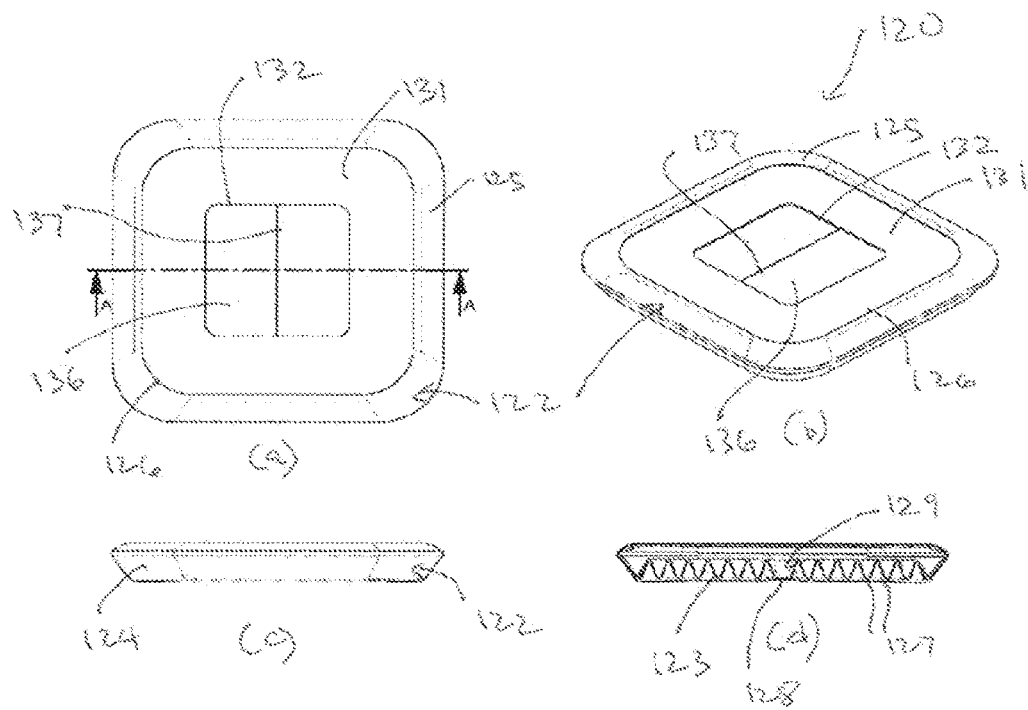
FIGURE 13

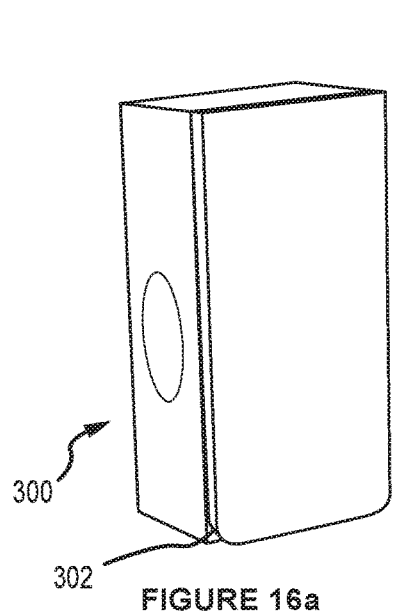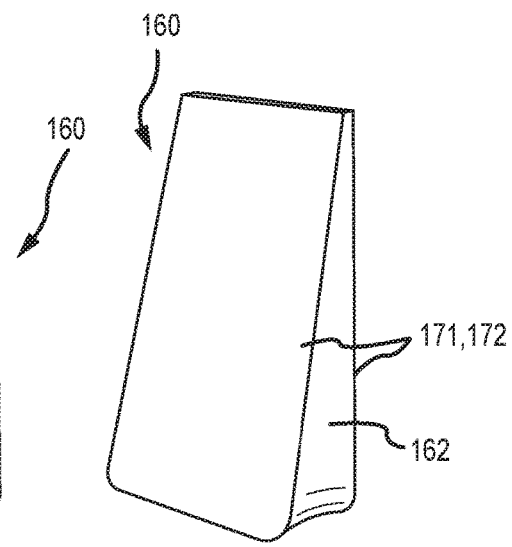
FIGURE 16a  FIGURE 16b
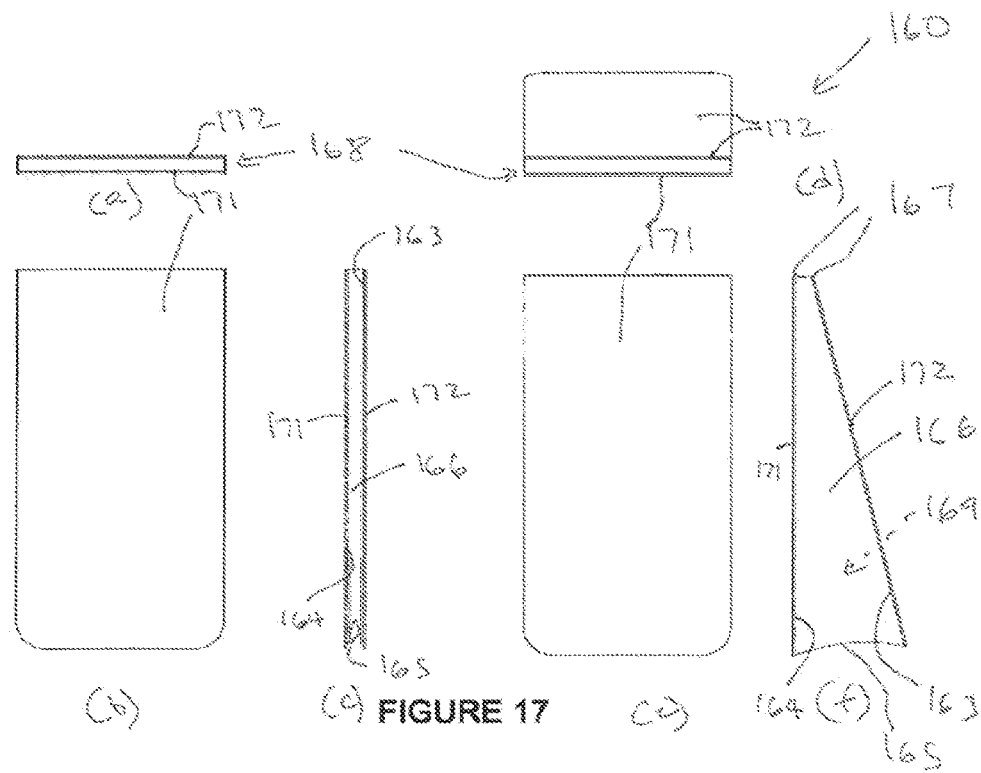
FIGURE 17

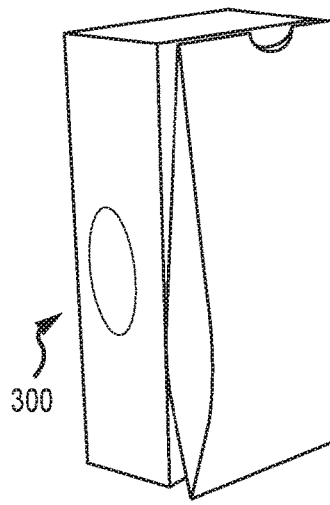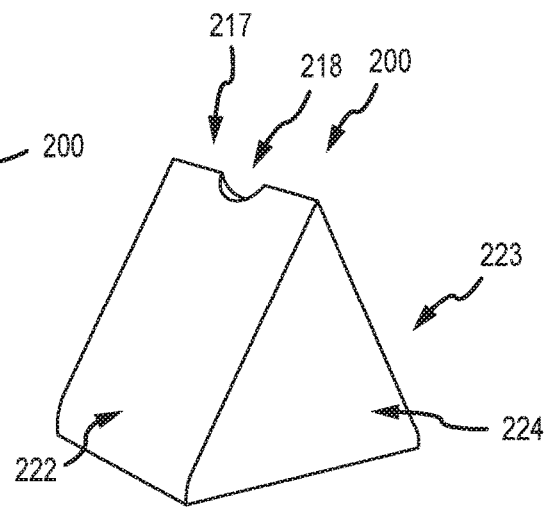
FIGURE 20a  FIGURE 20b
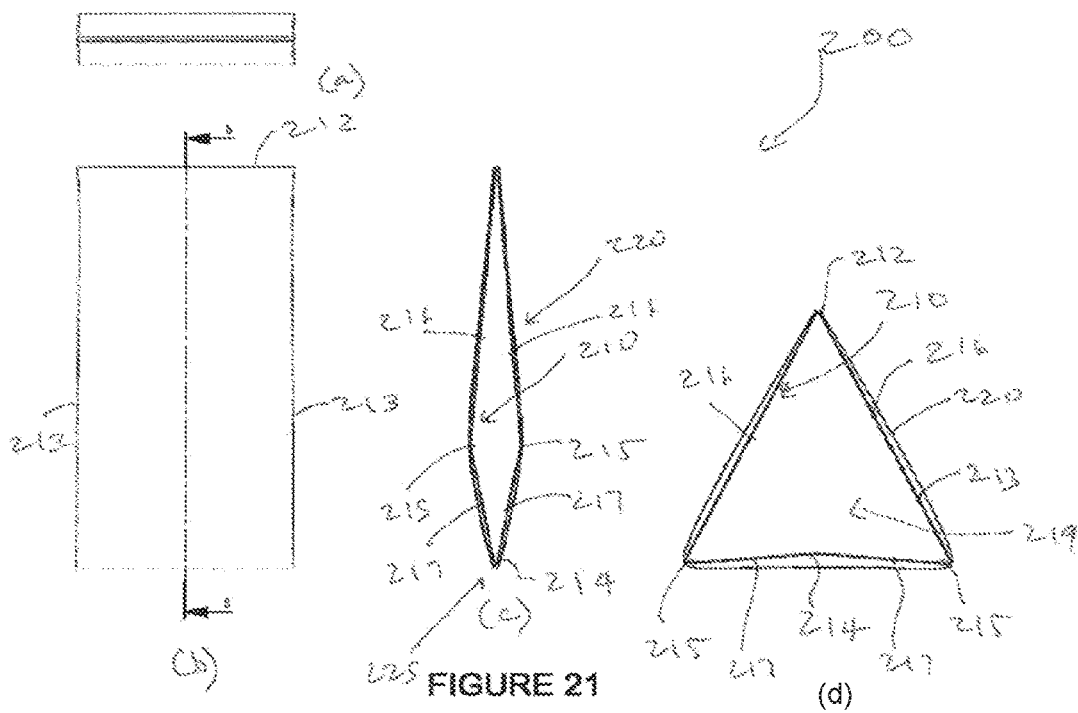
FIGURE 21

CONTAINER

CROSS REFERENCES TO RELATED APPLICATIONS

This application is a national stage entry of PCT/AU2012/001234 filed Oct. 15, 2012 and entitled "A Container," which claims priority to Australian Application Number 2011904229 filed Oct. 14, 2011 and entitled "A Container."

FIELD OF THE INVENTION

The present invention relates to container and in the preferred embodiments to a disposable container.

The invention has been developed primarily for the disposal of used tissues and will be described hereinafter with reference to this application. However, it will be appreciated that the invention is not limited to this particular field of use.

BACKGROUND OF THE INVENTION

Cold and flu viruses are a concern to the community and preventing the spread of the viruses is a desirable public health aim. The disposal of used tissues is a hygiene issue. At present, the only solution is to immediately bin the tissue. However, this is not always possible. Tissue users thus often store the used tissue in their pockets or handbags which is undesirable. Alternately, some users leave used tissue as litter.

The present invention seeks to overcome or substantially ameliorate at least some of the deficiencies of the prior art, or to at least provide an alternative. It is to be understood that, if any prior art information is referred to herein, such reference does not constitute an admission that the information forms part of the common general knowledge in the art, in Australia or any other country.

SUMMARY OF THE INVENTION

According to a first aspect, there is provided a container comprising a body having an internal container space and an opening, the opening being biased to a substantially closed configuration, at least opposing sections of the container being resiliently biased towards each other to minimize the volume of the internal container space, wherein a user can insert at least one item into the container space through the opening in use by temporary deformation of at least a portion of the container, and the resilient bias of the at least opposing sections of the container can apply a compressive force in use to the at least one item received in the container space.

Preferably, the container is disposable.

Preferably, the opening is biased to a substantially sealed configuration.

Preferably, the at least opposing sections of the container is made from a resilient material. Advantageously, the container can be used to store used tissues or other rubbish in a user's pocket or bag.

Preferably, the portion of the body is adjacent the opening.

Preferably, the opening comprises a slit formed in the body.

Advantageously, this provides a simple but effective opening.

Preferably, the body comprises at least one panel and the opening is formed along one panel of the body.

Alternatively, the body comprises at least one edge and the opening is formed adjacent an edge of the body.

Preferably, the body is adapted such that the container space is expandable.

Advantageously, the container starts at a minimal initial size and increases in bulk only as items are inserted.

Preferably, the one panel of the body is adapted to maintain a generally flat configuration around the opening.

Advantageously, this maintains the general configuration of the opening and thus the user can insert items into the opening in substantially the same manner irrespective of the amount of items within the container.

Preferably, at least a second portion of the body is made from a stretchable and/or expandable material.

Advantageously, this allows the container space to be expandable

Preferably, the second portion of the body is made from a resilient material.

Advantageously, this allows the container space to have a compression effect on the contents of the container.

Preferably, the container further comprises a flap for closing the opening.

Advantageously, this further seals the container for improved hygiene.

Preferably, the opening comprises edges which are substantially adjacent each other to provide the normally closed configuration of the opening.

Preferably, the opening is temporarily expanded in use by moving apart at least middle portions of the edges of the opening.

Advantageously, the opening is open only during the insertion of an item.

Preferably, the body is generally disc shaped.

Advantageously, the container does not include any corners which allows a user to conveniently store the container in his/her pocket or handbag.

Preferably, the body is substantially flat.

Advantageously, these allow the container to be easily stored in a user's pocket or bag.

Preferably, the body comprises a first panel and a second panel which are connected to each other substantially around their peripheral edges to define the container space therebetween.

Preferably, the opening extends across the first panel.

Preferably, at least a portion of the first panel is deformable or bendable to temporarily expand the opening.

Preferably, the second panel is made from a stretchable and/or expandable material.

Advantageously, this allows the container space to be expandable

Preferably, the second panel is made from a resilient material.

Advantageously, this allows the container space to have a compression effect on the contents of the container.

Preferably, the first panel and/or the second panel comprises a cover flap which can be folded over the opening for closing the opening.

Preferably, the first panel maintains a generally flat configuration.

Advantageously, this allows the opening to be accessible in substantially the same manner, irrespective of the number of items in the container.

In one embodiment, the first and second panels are substantially rigid and are joined by a stretchable peripheral material.

Advantageously, this maintains the side panels as generally flat in use.

Preferably, the peripheral material is a resilient material.

Advantageously, this provides a compression effect to the contents of the container.

In one embodiment, the peripheral material is formed integrally with the first and second panels.

Alternatively, the peripheral material is a separate piece which is attached to the first and second panels.

Preferably, the container is made from a readily biodegradable material.

Advantageously, this allows the container to be disposed of with its contents in a responsible manner.

Preferably, the container is made from a readily biodegradable plastics material.

Preferably, the container is made from liquid impervious material.

Advantageously, wet contents of the container will not contaminate the user's clothing or other surfaces in use.

Preferably, the container is made from anti-bacterial material.

Advantageously, this improves the hygienic quality of the container.

Preferably, the container is made from one integral piece of material.

Preferably, the container further comprises a liner disposed within the container space.

Preferably, the liner is substantially rigid.

Advantageously, the liner can maintain the shape of the container and the body can be made from thinner material.

Preferably, the liner is generally disc shaped.

Advantageously, the liner does not include any corners which reduces the risk of the liner piercing the body. Thus, the body can be made from very thin and light material.

Preferably, the liner comprises an aperture aligned with the body opening.

Preferably, the liner is made from a recycled or readily biodegradable material.

Advantageously, this allows the filled container with the liner to be disposed of in a responsible manner.

Preferably, the liner is adapted to selectively expand the container space.

Preferably, the liner comprises two side sections and at least two base sections, wherein the at least two base sections can be folded relative to the side sections to selectively expand the container space.

Advantageously, this provides an effective means of expanding the container space to accommodate larger or more items.

Preferably, the two side sections and the at least two base sections are respectively substantially parallel and facing each other in one configuration.

Advantageously, the liner is initially flat when the container is empty.

Preferably, at least one fold line connects the at least two base sections.

Preferably, at least one fold line connects each side section to at least one of the base sections.

Preferably, edges of the liner adjacent the opening are offset from each other.

Advantageously, this allows easy access to the container space.

Alternatively, one edge of one side section adjacent the opening comprises a cutout and the container comprises a corresponding cutout.

Advantageously, this allows an alternative access to the container space.

Preferably, the container is adapted to substantially compress items placed within the container space.

Advantageously, the container even when filled occupies minimal space. Compression makes the disposed items smaller while in the possession of the user and in bins during waste transfer.

In one embodiment, the second panel is a rolled tube and the container space is expandable by incremental unrolling of the rolled tube.

In this embodiment, the first panel includes a curved rim edge within which a rolled periphery of the rolled tube is contained.

In another embodiment, the container comprises the body and a liner, the body comprising a base panel, a side wall extending from the base panel and an internal peripheral flange extending inwardly from the side wall which defines a central aperture, the liner comprising an upper main panel extending across the central aperture and defining the opening, and side walls extending downwardly from the peripheral edges of the main panel, wherein the body is made from resilient material and the liner maintains the shape of the body.

Preferably, the opening is cross-shaped and comprises slit portions at its points.

Preferably, the base panel is stretchable or expandable.

In another embodiment, the body comprises a base panel, a side wall extending from the base panel and an internal peripheral flange extending inwardly from the side wall which defines the opening, wherein the side wall is concertina shaped so as to be expandable in use and is resiliently biased to a compressed configuration.

In another embodiment, the body comprises a base panel, a side wall extending from the base panel and an internal peripheral flange extending inwardly from the side wall which defines the opening, wherein the base panel comprises a series of concentric folds so as to be expandable in use and is resiliently biased to its folded configuration.

Preferably, the container further comprises a panel body extending between the upper peripheral edges of the side wall to maintain the shape of the body.

Preferably, the panel body comprises a central aperture having a liner extending thereacross, the liner having a slit opening which extends across the central aperture.

In another embodiment, the container comprises the body and a support member, the body comprising a first panel and a second panel joined along their bottom edge and side edges, the support member comprising a panel body folded along a central fold to form a first portion and a second portion which respectively cover upper portions of the first and second panels, each of the first and second portions comprising an upper flange which is folded into the opening of the main body.

In another embodiment, the container comprises the body and support members, the body comprising a first panel and a second panel joined along their bottom edge by a bottom panel and side edges by generally triangular side panels, the support members comprising rigid or semi-rigid panels attached to a respective one of the first and second panels, wherein the container is resiliently biased to a compacted configuration at which the first and second panels are adjacent each other, and the container can be expanded at which lower ends of the first and second panels are apart from each other thus unfolding the base panel and the side panel.

In another embodiment, the body comprises a first panel and a second panel joined along their bottom edge and side edges, top edges of the first and second panels defining the opening of the body, wherein the top edges are generally U-shaped and forms handles at the upper portions of the first and second panels, wherein the handles can be tied to each other to close the container opening.

In another embodiment, the body comprises a rigid or semi-rigid insert and a flexible cover, wherein the insert is folded and includes free edges that the define the opening therebetween, the cover covering external surfaces of the insert, and wherein the insert comprises additional folds for configuring the insert into a generally triangular shape.

Preferably, the folds are adapted such that the container remains in an expanded configuration as desired, and returns to a folded configuration when the folds are actuated.

In another embodiment, the body is a generally flat, pod-shaped body having a closed lower portion and an upper portion which includes a slit opening, wherein squeezing side edge portions of the body disposed on opposing sides of the opening toward each other deforms the body and enlarges the opening.

Preferably, the body generally comprises two halves joined along an edge.

The present invention also provides a method for the disposal of at least one item within a container having an internal container space and an opening biased into a closed configuration, the method comprising inserting the at least one item into the container space through the opening by temporary deformation of at least a portion of the container, wherein the container is resiliently biased to minimize the container space and apply a compression force to the contents of the space in use.

The present invention also provides a wipe dispenser having the container of the above attached thereto.

Preferably, the container is removably attached to the wipe dispenser.

Preferably, the wipe dispenser is a tissue dispenser.

Other aspects of the invention are also disclosed.

BRIEF DESCRIPTION OF THE DRAWINGS

Notwithstanding any other forms which may fall within the scope of the present invention, preferred embodiments of the invention will now be described, by way of examples only, with reference to the accompanying drawings in which:

FIG. 12 shows a container in accordance with another preferred embodiment of the present invention where (a) is a top perspective view, and (b) is a bottom perspective view;

FIG. 13 shows one of the containers of FIG. 12 where (a) is a top view, (b) is a perspective view, (c) is a side view, and (d) is a cross-section view along line A-A;

FIG. 16 (a) is a perspective view of a tissue box and a container in accordance with another preferred embodiment of the present invention, and (b) shows the container in the expanded configuration thereof;

FIG. 17 shows the container of FIG. 16 where (a) is a top view, (b) is a front view and (c) is a side view of the container in the compacted configuration, and (d) is a top view, (e) is a front view and (f) is a side view of the container in the expanded configuration;

FIG. 20 (a) is a perspective view of a tissue box and a container in accordance with another preferred embodiment of the present invention, and (b) shows the container in the expanded configuration thereof;

FIG. 21 shows the container of FIG. 20 where (a) is a top view, (b) is a front view, (c) is a cross-section view along line B-B, and (d) is a cross-section view along line B-B when the container is in the expanded configuration;

DETAILED DESCRIPTION OF SPECIFIC EMBODIMENTS

Figure 1:
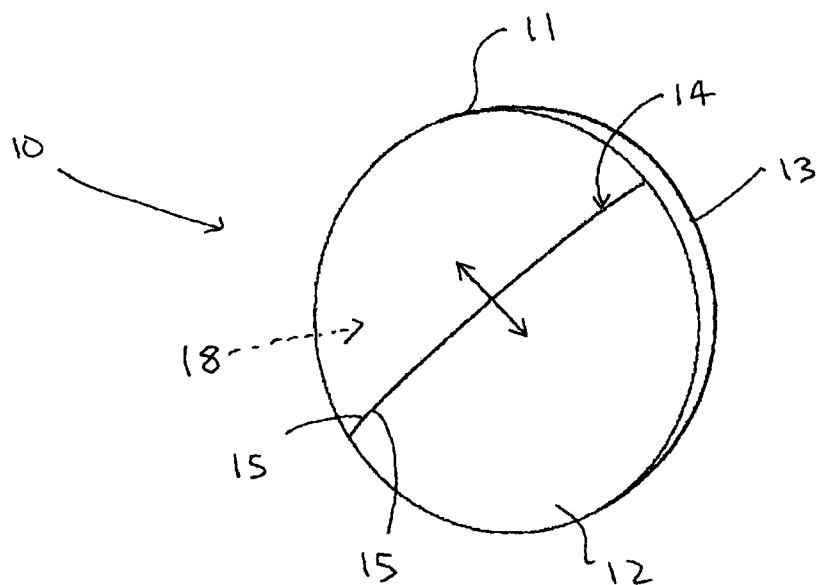
FIG. 1 is a perspective view of a container in accordance with a preferred embodiment of the present invention.

It should be noted in the following description that like or the same reference numerals in different embodiments denote the same or similar features.

FIG. 1 shows a container 10 in accordance with a first preferred embodiment of the present invention. The container 10 includes a body 11 which is of a generally flat circular disc shape, having a first circular panel 12 and a second circular panel 13. The first and second panels 12 and 13 are connected to each other around their peripheral edges to define an internal container space 18 therebetween.

The body 11 includes a slit opening 14 which extends diametrically across the first panel 12. The slit opening 14 is biased to a closed configuration (and preferably a substantially sealed configuration) by having its edges 15 adjacent and touching each other. The first and second panels 12 and 13 are made from a material which maintains the general shape of the container 10 but allows at least a portion of the first panel 12 to be bent or deformed such that a user can insert items into the container space 18 by temporary expansion of the slit opening 14. Thus, a user can insert a used tissue into the container space 18 by using his/her finger to force the tissue through the slit opening 14. Expansion in this sense is any relative movement between the edges 15 which spaces at least middle portions of such edges 15 apart. For example, the middle portions of the edges 15 can move laterally apart, one edge 15 can move away from the second panel 13 whilst the other edge 15 moves toward the second panel 13, or both middle portions of the edges 15 can be bent generally inwardly temporarily toward the second panel 13. After insertion, the slit opening 14 returns to its closed state.

The second panel 13 is made from a stretchable and/or expandable material, which stretches/expands when an item is placed within the container space 18. In the example, the second panel 13 stretches to accommodate the used tissue within the container space 18. When further used tissues are inserted into the container space 18, the second panel 13 stretches further into a generally concave shape whilst the first panel 12 maintains a generally flat configuration. The second panel 13 is also a resilient material and can thus substantially compress the used tissues within the container space 18 against the first panel 12. The disposed tissues are thus smaller while in the possession of the user and in bins during waste transfer.

Thus, opposing panel sections 12 and 13 of the body 11 are resiliently biased towards each other which minimizes the volume of the internal container space 18, particularly when the container 10 is empty. One benefit of the container being resiliently biased to retain its smallest shape is it minimizes the inconvenience of carrying the disposal container. The resilient bias of opposing panel sections 12 and 13 of the body 11 also applies a compressive force in use to the item received in the container space, being tissues in the preferred embodiment.

The container 10 is made from a readily biodegradable material, such as a biodegradable plastics material, which is preferably biodegradable latex. The material is liquid impervious and preferably anti-bacterial. The container 10 is dimensioned to hold 3 or 4 used tissues in a compressed and hygienic manner until the filled container 10 is disposed of in a bin.

The present invention thus provides a disposable container suitable for used tissues. The container is advantageously for use whenever a bin is not available or when moving to dispose of the tissue immediately after use is not appropriate. The container is particularly useful while on public transport, in meetings, cinemas or in class lectures.

The container provides a hygienic and visually acceptable method to store used tissues until disposal of the filled container in a bin is possible. The container in the embodiment is ring shaped and when empty is nearly flat, making it suitable to use in a user's pocket or handbag.

The container in the embodiment has a diameter of six or seven centimetres. However, the container can be made in any shape or dimensions as desired. For example, the container can be made in a larger size for storing more tissues. The larger version is suitable for use in cars or on aeroplanes. In public places, such as hotels, hospitals and aeroplanes, the container could be provided for the consumer by the manager of the area for the protection of others present and of staff, including cleaning staff.

The container is designed to be readily biodegradable and thus disposable. However, it can also be made from material that will allow users to re-use the container if desired.

The container can be permanently or detachably attached to a small pocket sized tissue container, or a wipes container of any size or function, including wet wipes.

The container can also include decoration or indicia printed on the first and second panels, such as decoration or advertising. Ideally, one or more of the containers is provided with a tissue pack as sold by manufacturers. In another embodiment, the container can be attached to a closed side of a tissue dispenser.

In the embodiment of FIG. 1, the first panel 12 remains substantially flat during use whilst the second panel 13 stretches into a generally concave shape. In one embodiment for example, the first panel has a sufficient thickness or rigidity to substantially maintain its flat shape but allow users to insert items through the opening 14, whilst the second panel is made from a thinner stretchable/expandable material which allows same to stretch or expand as more items are placed within the container space. The first and second panels 12 and 13 can be made as one integral piece or two or more pieces attached to each other.

In another embodiment, both the first and second panels 12 and 13 are substantially rigid and are joined by a stretchable peripheral material extending between the peripheries of the first and second panels. In this embodiment, the first and second panels 12 and 13 maintain a generally flat shape in use and expansion of the container space is provided by the peripheral material. The container in this embodiment thus maintains generally flat side panels. The peripheral material is preferably made from a resilient material to provide a compression effect to the contents of the container as the opposing first and second panels are resiliently biased towards each other. The peripheral material can be formed integrally with the first and second panels or can be a separate piece which is attached to the first and second panels.

Figure 2:
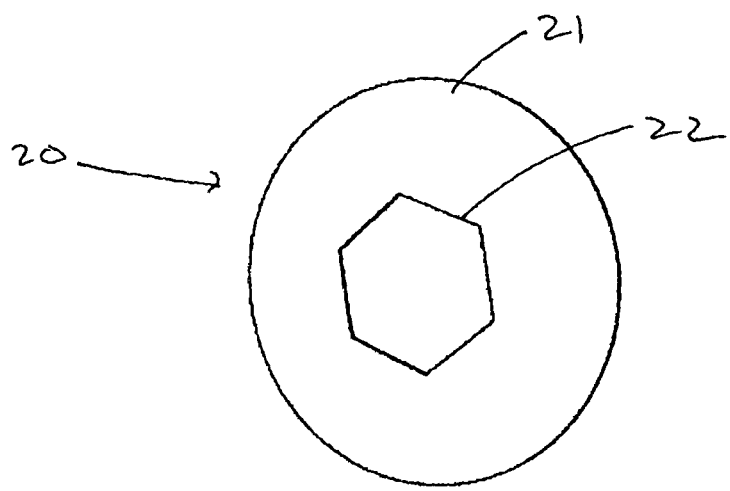
FIG. 2 is a perspective view of a liner for a modified embodiment of the container of FIG. 1.

FIG. 2 shows a liner 20 for a modified embodiment of the container 10 of FIG. 1. The liner 20 comprises a flat disc 21 having a central aperture 22. In the embodiment, the central aperture 22 is hexagonal in shape. In this modified embodiment, the first and second panels 12 and 13 are made from a thin flexible and stretchable material, with the liner 20 received within the container space 18 between the panels 12 and 13. The liner 20 thus maintains the desired round disc container shape, with the opening 14 being aligned with the aperture 22 of the liner 20. A user can thus insert items into the container space 18 through the aligned opening 14 and aperture 22. The container space 18 in this embodiment is generally defined between the liner 20 and the second panel 13, which are essentially resiliently biased towards each other.

The liner 20 is made from a recycled or readily biodegradable material, such as cardboard. This embodiment thus allows the container 10 to have first and second panels 12 and 13 which can be thinner. The first and second panels 12 and 13 can be made as one integral piece.

Figure 3:
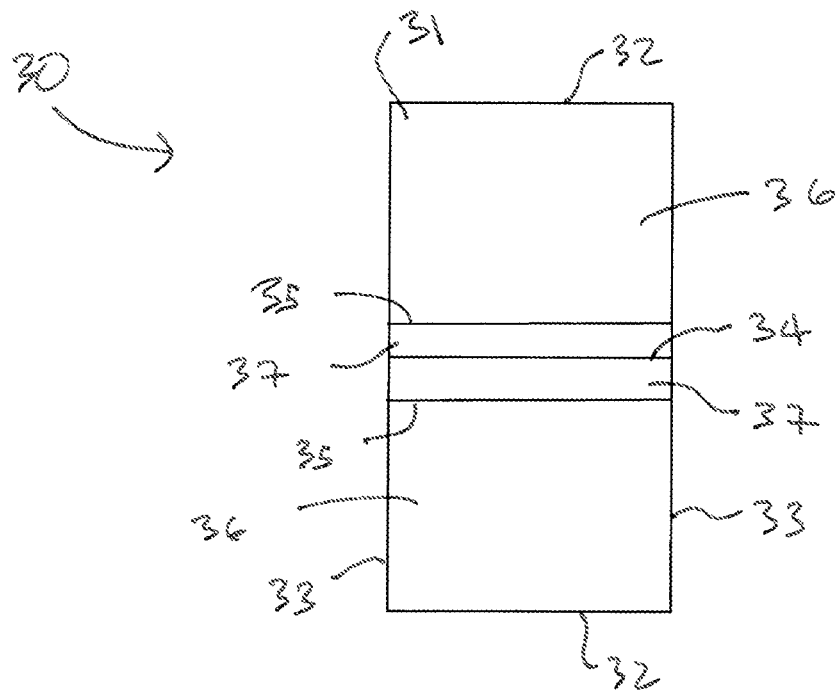
FIG. 3 is a front view of an unfolded liner for a container in accordance with another embodiment of the container.

FIG. 3 shows a liner 30 for another embodiment of the container. The liner 30 is a flat generally rectangular member 31 having short edges 32 and long edges 33. The liner 30 includes a primary foldline 34 extending between the long edges 33 and located generally halfway between the short edges 32. The liner 30 also includes two secondary foldlines 35 which are substantially parallel to the primary foldline 34 and located at opposite sides thereof. The secondary foldlines 35 are substantially equally spaced from the primary foldline 34.

The foldlines 34 and 35 define side sections 36 of the liner 30 which respectively extend between a short edge 32 and a secondary foldline 35, and base sections 37 which respectively extend between a secondary foldline 35 and the primary foldline 34.

Figure 4:
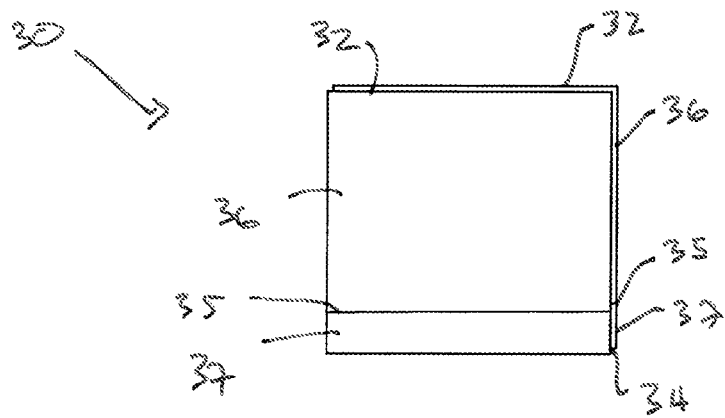
FIG. 4 is a perspective view of the liner of FIG. 3 in a folded configuration.

FIG. 4 shows the liner 30 in its initial folded configuration, where the liner 30 is folded along the primary foldline 34 such that the side sections 36 and base sections 37 are substantially parallel, adjacent and facing each other. The short edges 32 are substantially aligned, or one short edge 32 may be slightly offset from the other short edge 32.

Figure 5:
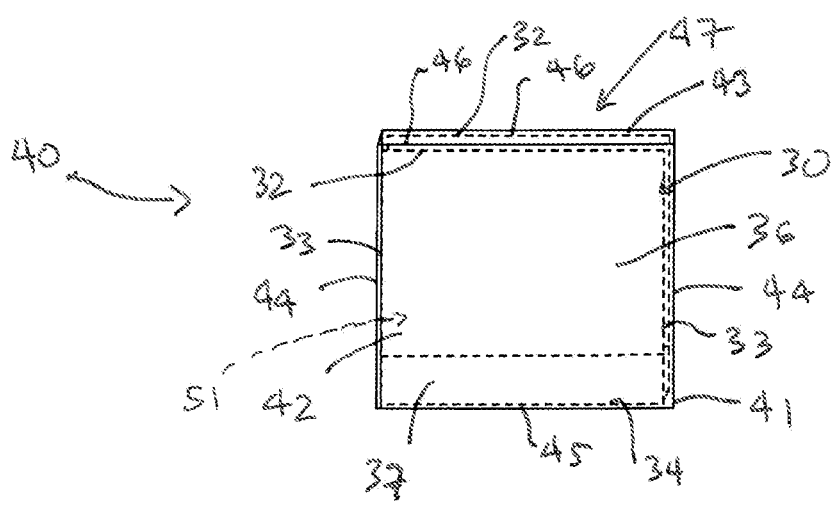
FIG. 5 is a perspective view of a container in accordance with another preferred embodiment of the present invention having a cover and the liner of FIG. 3.

FIG. 5 shows the liner 30 (in dashed lines) received within the internal container space 51 of a container body 41, for forming a container 40. The container body 41 is made from a resilient material and includes first and second panels 42 and 43 which are connected to each other along their side edges 44 which are adjacent respective long edges 33 of the folded liner 30, and lower edges 45 which are adjacent the primary foldline 34. The container body 41 thus resiliently biases the opposing base sections 37 and side sections 36 of the body 41 towards each other.

Upper edges 46 of the first and second panels 42 and 43 are not attached to each other and form an opening 47 for the container 40. As with the container 10, the opening 47 of the container 40 is biased to a closed, preferably substantially sealed, configuration. The opening 47 is thus also shaped generally as a slit, similar to that of the container 10.

To allow a user to insert items into the container space, the upper edges 46 of the first and second panels 42 and 43, are slightly offset from each other corresponding to the offset short edges 32 of the liner 30. The user can then insert items into the container space by pushing against one of the edges 32 and 46.

The user can also push the lower edge 45 against a surface such as a table, which folds the base sections 37 relative to the side sections 36. The base sections 37 are folded toward the surface which effectively expands the container space 51. The base sections 37 in this embodiment are folded such that they are flat against the surface to form a flat container base. The container 40 can then be lifted from the surface at which the liner 30 is substantially returned to its substantially flat configuration by the container body 41, which compresses the contents of the container space. The resilient bias of the opposing base sections 37 and side sections 36 apply a compressive force to the contents received in the container space.

The container 40 can be used for disposing larger items, such as used sanitary pad, diapers or for disposing larger number of used tissues.

Figure 6:
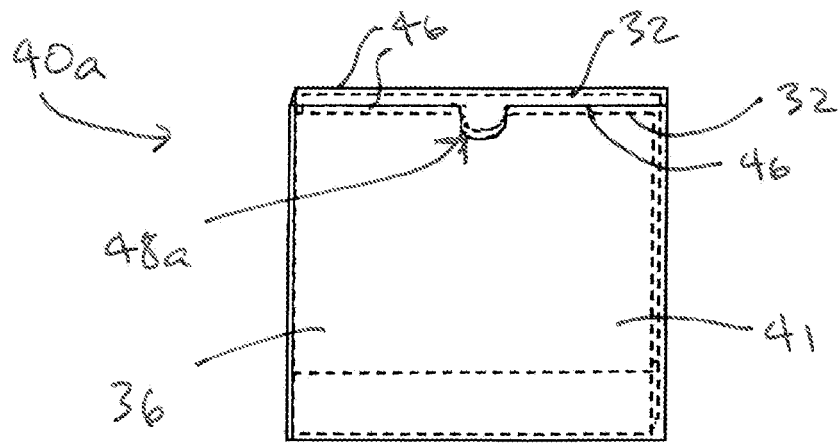
FIG. 6 is a perspective view of a modified embodiment of the container of FIG. 5.

FIG. 6 shows a container 40a which is a modification of the container 40. The container 40a is substantially identical to the container 40 except that the upper edge 46 of the first panel 41 and the short edge 32 of one side section 36 includes a semi-circle cutout 48a, which allows for easy insertion of items into the container space. The upper edges 46 of the first and second panels 42 and 43 and the short edges 32 of the side sections 36 in this embodiment can be aligned.

Figure 7:
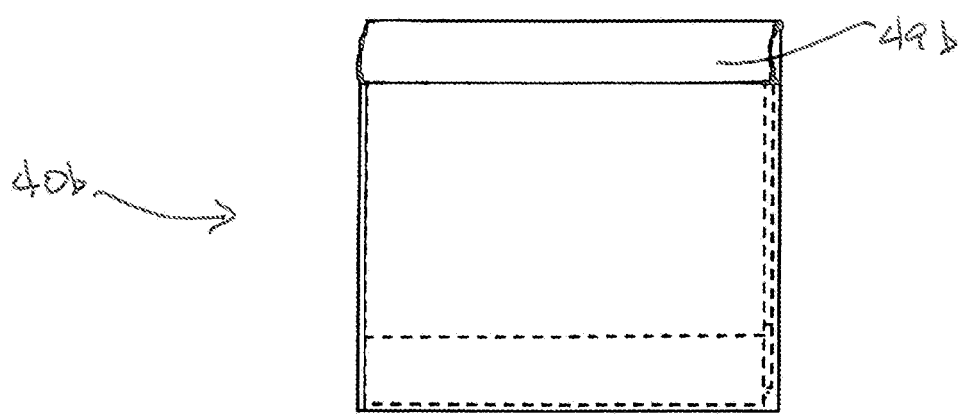
FIG. 7 is a perspective view of another modified embodiment of the container of FIG. 5.

FIG. 7 shows a container 40b which is another modification of the container 40. The container 40b is substantially identical to the container 40 except that the second panel 43 includes a cover flap 49b which is folded over the opening 47 for closing the opening 47 to further hygienically seal the contents of the container space.

It will be appreciated that modifications can be made to the above embodiments. For example, the container can be made in any shape and dimension as desired. The container can also be used as a bin for normal rubbish. A user on public transport can thus use the container to contain food packaging, fruit cores or peelings and any rubbish as required.

In one possible embodiment, the second panel is a rolled tube and the container space is expandable by incremental unrolling of the rolled tube. The first panel in this embodiment will include the opening, and an arc curved rim edge within which the rolled periphery of the rolled tube is contained. As items are inserted, the rolled tube unrolls a little each time. The first panel is made from rigid or semi-rigid material with the rolled tube second panel being made from flexible and/or resilient material.

Figure 8:
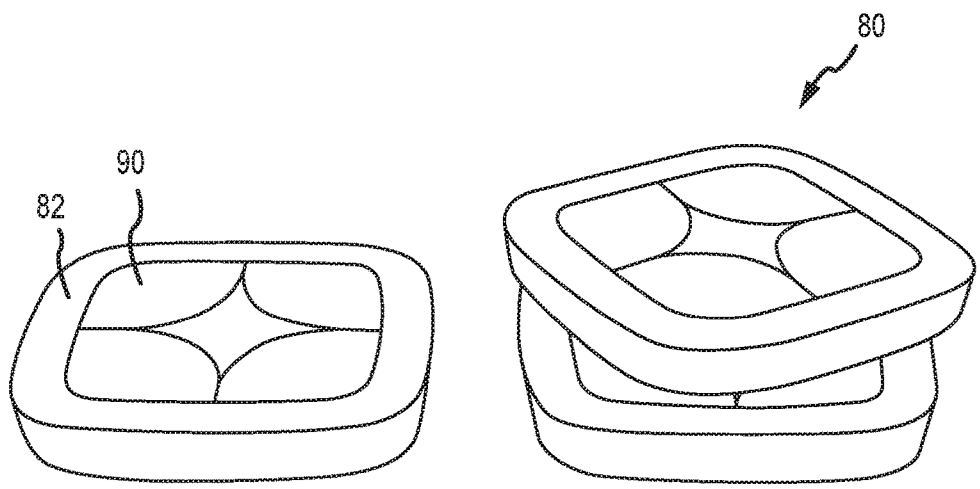
FIG. 8 is a perspective view of three containers in accordance with another preferred embodiment of the present invention.
Figure 9:
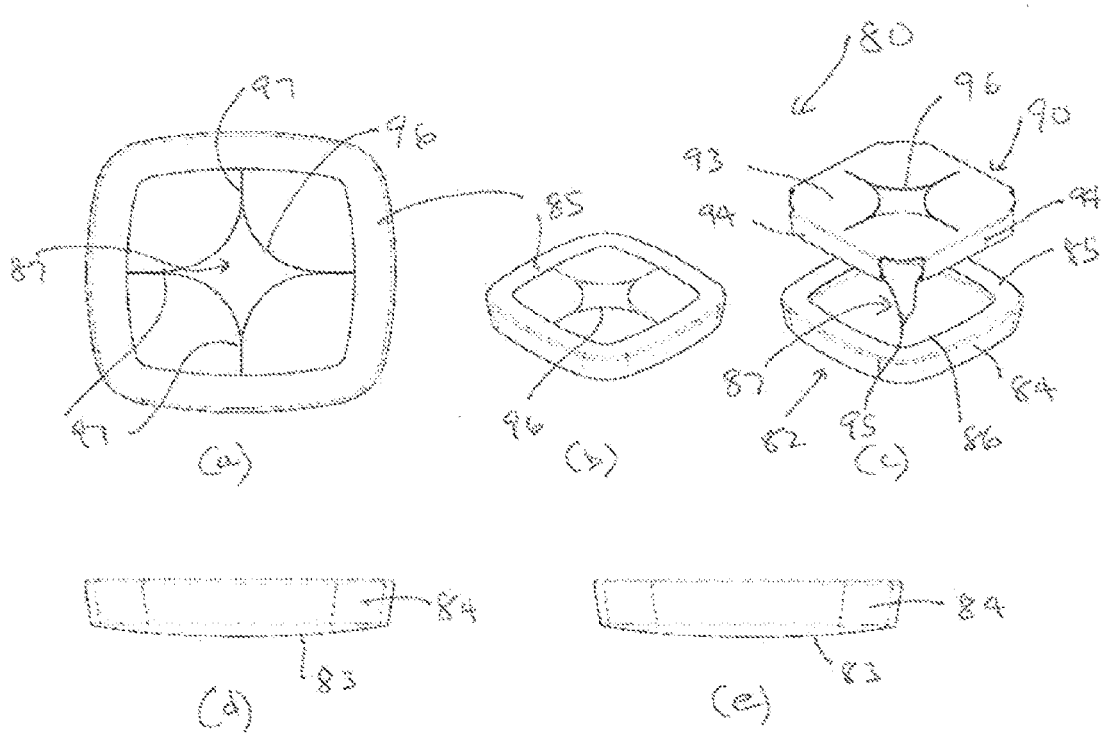
FIG. 9 shows one of the containers of FIG. 8 where (a) is a top view, (b) is a perspective view, (c) is an exploded perspective view, (d) is a first side view, and (e) is a second side view.

FIGS. 8 and 9 show another embodiment of a container 80 according to the present invention. The container 80 comprises a body 82 and a liner 90. The body 82 is made from resilient latex material and comprises a base panel 83, a side wall 84 extending from the peripheral edge of the base panel 83 and an internal peripheral flange 85 extending inwardly from an upper peripheral edge of the side wall 84. The internal flange 85 defines a central aperture 86, which provides access to an internal space 87 defined between the base panel 83, the side wall 84 and the internal flange 85.

The liner 90 comprises an upper main panel 93, side walls 94 extending from the peripheral edges of the main panel 93 and internal flanges 95 extending inwardly from lower edges of the side walls 94. The main panel 93 comprises a central cross-shaped opening 96 which includes slit portions 97 at its points. The liner 90 is disposed within the internal space 87 of the body 82 and maintains the shape of the body 82. The liner 90 is made from rigid or semi-rigid material such as recyclable plastics or cardboard. The opening 96 provides access to the internal space 87 with the slit portions 97 temporary deforming if required for inserting items into the internal space 87. The base panel 83 can be adapted to be stretchable or expandable.

The opening 96 in a preferred embodiment is smaller than that shown, and is biased to a substantially closed or sealed configuration. In this embodiment, at least the opposing sections of the container 80, being the base panel 83 and main panel 93 are resiliently biased towards each other to minimize the volume of the internal container space. The resilient bias of the opposing base panel 83 and main panel 93 can apply a compressive force in use to the items received in the container space 87.

Figure 10:
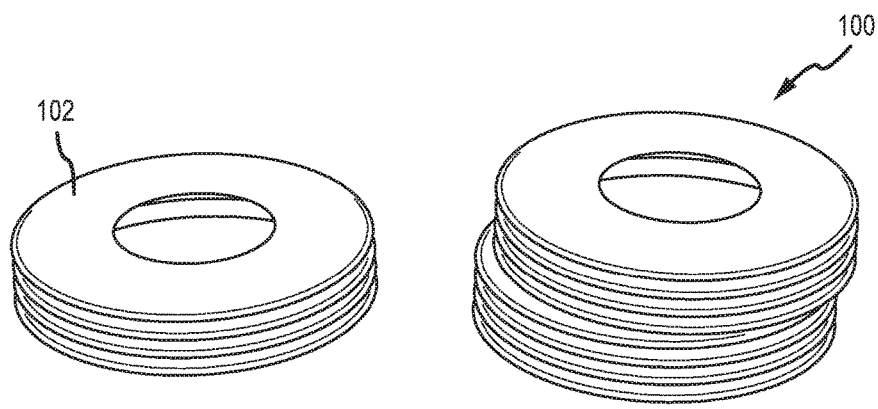
FIG. 10 is a perspective view of three containers in accordance with another preferred embodiment of the present invention.
Figure 11:
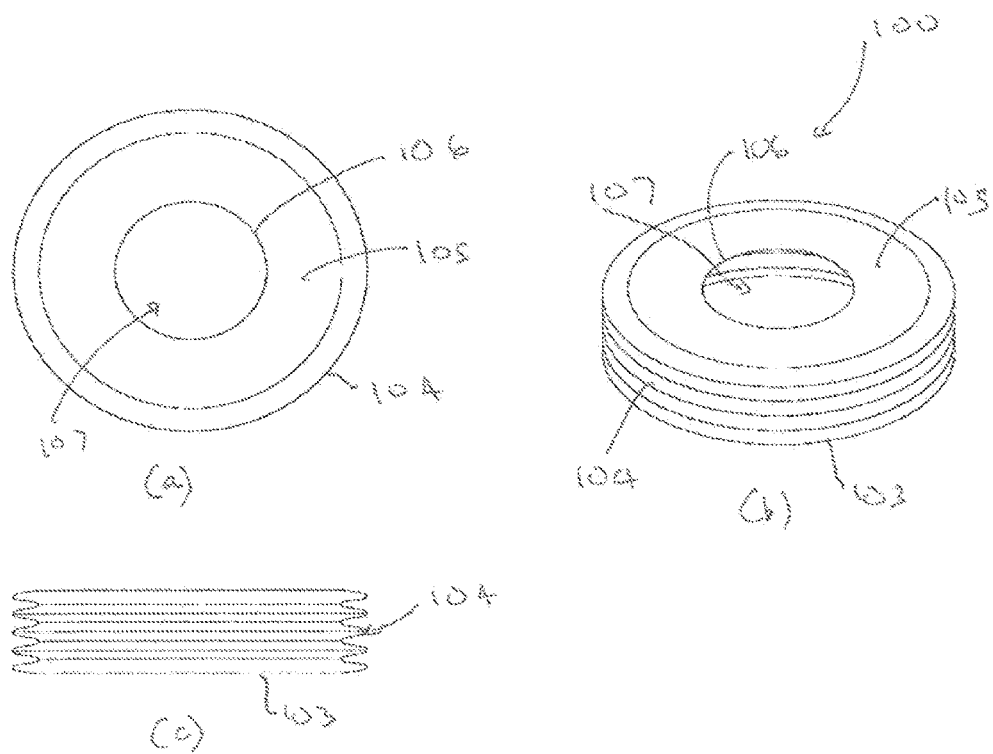
FIG. 11 shows one of the containers of FIG. 10 where (a) is a top view, (b) is a perspective view, and (c) is a side view.

FIGS. 10 and 11 show another embodiment of a container 100 according to the present invention. The container 100 comprises a body 102 made from resilient balloon like latex material and comprises a base panel 103, a concertina shaped side wall 104 extending from the peripheral edge of the base panel 103 and an upper internal flange 105 extending inwardly from an upper peripheral edge of the side wall 104. The internal flange 105 defines a central aperture 106, which provides access to an internal space 107 defined between the base panel 103, the side wall 104 and the internal flange 105. The side wall 104 is expandable in use which increases the volume of the internal space 107.

The opening 106 in a preferred embodiment is smaller than that shown, and is biased to a substantially closed or sealed configuration. The opening 106 for example can include resilient flaps or overlapping members. In this embodiment, at least the opposing sections of the container 100, being the base panel 103 and upper flange 105 are resiliently biased towards each other to minimize the volume of the internal container space. The side wall 104 is biased towards its compressed configuration. The resilient bias of the opposing base panel 103 and upper flange 105 can apply a compressive force in use to the items received in the container space 107.

FIGS. 12 and 13 show another embodiment of a container 120 according to the present invention. The container 120 comprises a body 122, a support panel 130 and a liner 135. The body 122 is made from resilient latex material and comprises a base panel 123, a side wall 124 extending from the peripheral edge of the base panel 123 and an internal peripheral flange 125 extending inwardly from an upper peripheral edge of the side wall 124. The internal flange 125 defines a central aperture 126.

The base panel 123 comprises a series of concentric folds 127 centered to a central portion 128, which effectively allows the base panel 123 to expand in use.

The support panel 130 comprises a rigid rectangular panel body 131 having a central aperture 132. The support panel 130 extends between the upper peripheral edge of the side wall 124 to maintain the shape of the body 122.

The liner 135 comprises a semi-flexible body 136 having a slit opening 137 which extends across the aperture 132 of the support panel 130. In use, items are inserted through the slit opening 137 which expands an internal space 129 of the container 120 via expansion of the base panel 123.

In this embodiment, at least the opposing sections of the container 120, being the base panel 123 and the combination of the support panel 130 and liner 135 are resiliently biased towards each other to minimize the volume of the internal container space. The base panel 123 is biased towards its compressed folded configuration.

Figure 14:
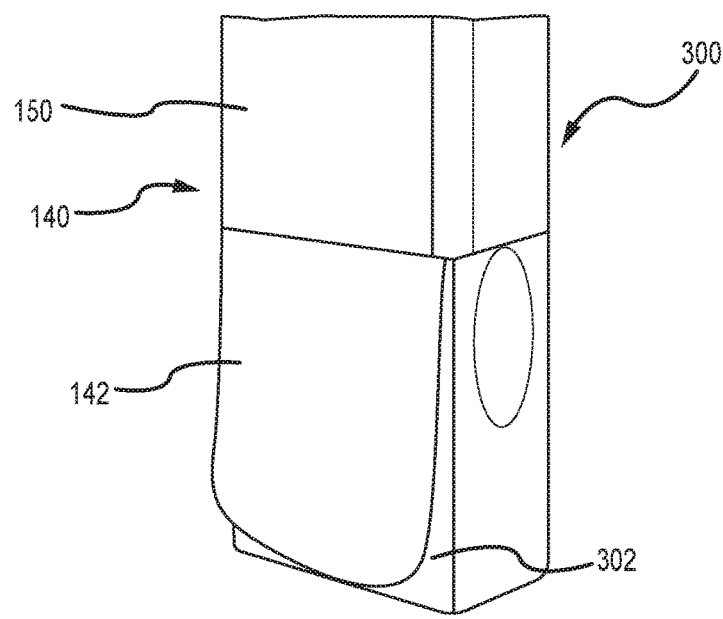
FIG. 14 is a perspective view of a tissue box and a container in accordance with another preferred embodiment of the present invention.

FIG. 14 shows a tissue box 300 and a container 140 according to another embodiment of the present invention. The container 140 is permanently attached or removably attached to one wall 302 of the tissue box 300, such as a side or bottom wall thereof.

Figure 15:
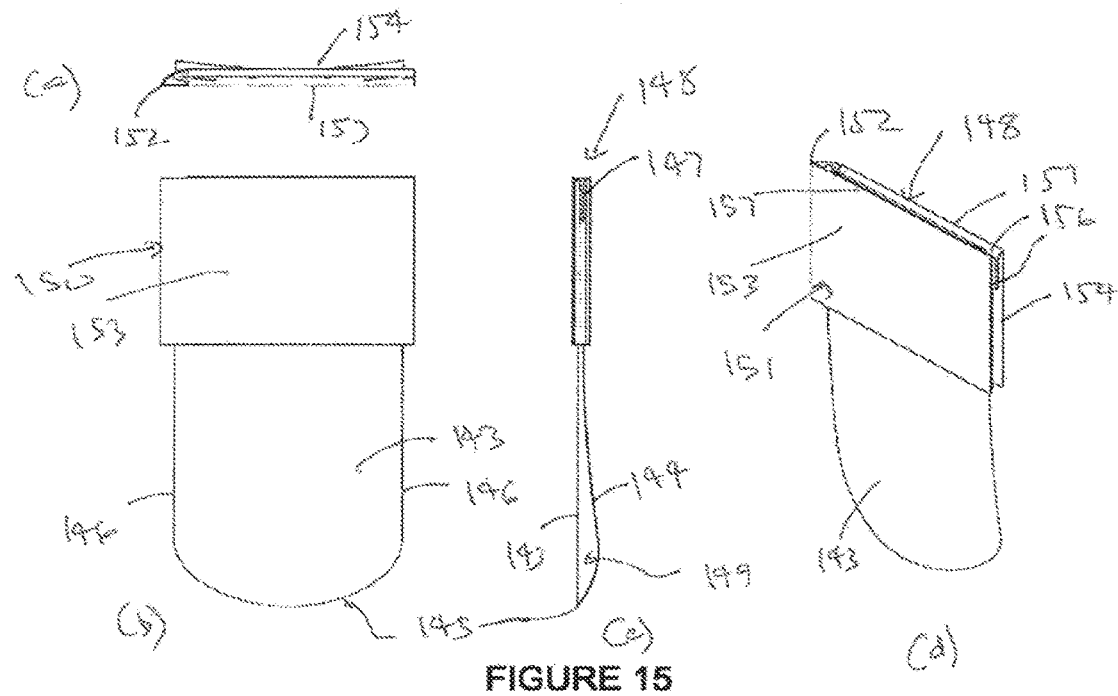
FIG. 15 shows the container of FIG. 14 where (a) is a top view, (b) is a front view, (c) is a side view, and (d) is a perspective view.

As shown in FIG. 15, the container 140 comprises a main body 142 and a support member 150. The body 142 is made from resilient latex material and comprises a first panel 143 and a second panel 144 joined along their bottom edge 145 and side edges 146. The top edges 147 of the panels 143 and 144 are not joined to each other and define an opening 148 of the main body 142 for accessing an internal space 149 thereof.

The support member 150 comprises a panel body 151 folded along a central fold 152 to form a first portion 153 and a second portion 154. The central fold 152 is disposed along one side edge of the main body 142. The first and second portions 153 and 154 cover the upper portions of the first and second panels 143 and 144, respectively. Each of the first and second portions 153 and 154 includes an upper flange 156 which is folded into the opening 147 of the main body 142 along foldlines 157. The upper flanges 156 thus extend over the top edges 147 of the main body 142 and form an entry portion for the internal space 148. In this embodiment, the container 140 can be attached to the tissue box 300 via the second portion 154. If the container 140 is removably attached to the tissue box 300, the container 140 can be removed therefrom, used and disposed of independently of the tissue box 300.

In this embodiment, at least the opposing sections of the container 140, being the first panel 143 and the second panel 144 are resiliently biased towards each other to minimize the volume of the internal container space 149, and thus apply a compression force to its contents in use.

FIG. 16 shows a tissue box 300 and a container 160 according to another embodiment of the present invention. The container 160 is also permanently attached or removably attached to one wall 302 of the tissue box 300, such as a side or bottom wall thereof.

The container 160 comprises a main body 162 and support members 171 and 172. The body 162 is made from resilient latex material and comprises a first panel 163 and a second panel 164 which are joined to each other along their bottom edges by a bottom panel 165 and along their side edges by generally triangular side panels 166. The top edges 167 of the panels 163 and 164 are not joined to each other and define an opening 168 of the main body 142 for accessing an internal space 169 thereof.

The triangular shape of the side panels 166 allows them to fold and also allows the base panel 165 to fold, although these panels 166 and 165 are resilient and bias the opposing panels 163 and 164 towards each other. The support members 171 and 172 in this embodiment comprise rigid or semi-rigid panels of the same size and attached to a respective one of the panels 163 and 164. The support members 171 and 172 can be made from cardboard material.

Thus, the container 160 is resiliently biased to a compacted configuration at which the panels 163 and 164 are adjacent each other, and the container can expand at which lower ends of the panels 163 and 164 are moved apart from each other thus unfolding the base panel 165 and the side panels 166 and expanding the internal space 169. The panels 163 and 164 being biased towards each other apply a compression force to contents of the internal space 169.

If the container 160 is removable from the tissue box 300, the container 160 can be used and disposed independently of the tissue box 300.

Figure 18:
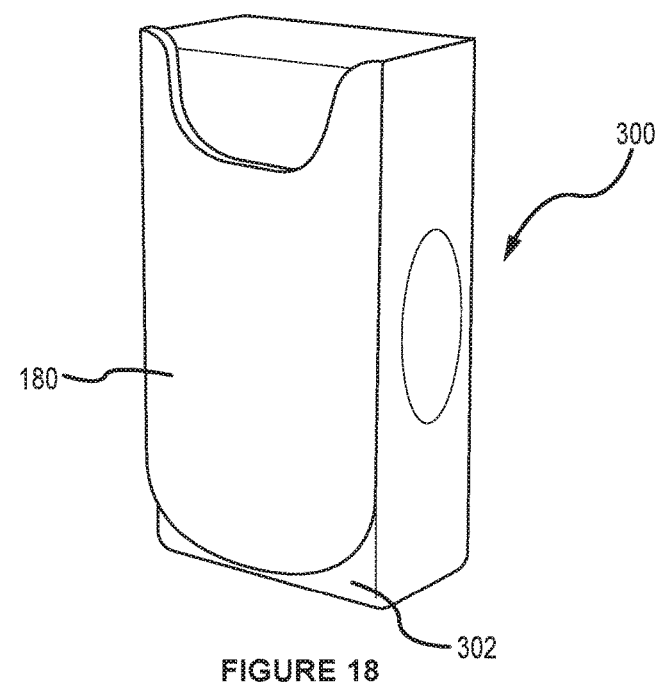
FIG. 18 is a perspective view of a tissue box and a container in accordance with another preferred embodiment of the present invention.
Figure 19:
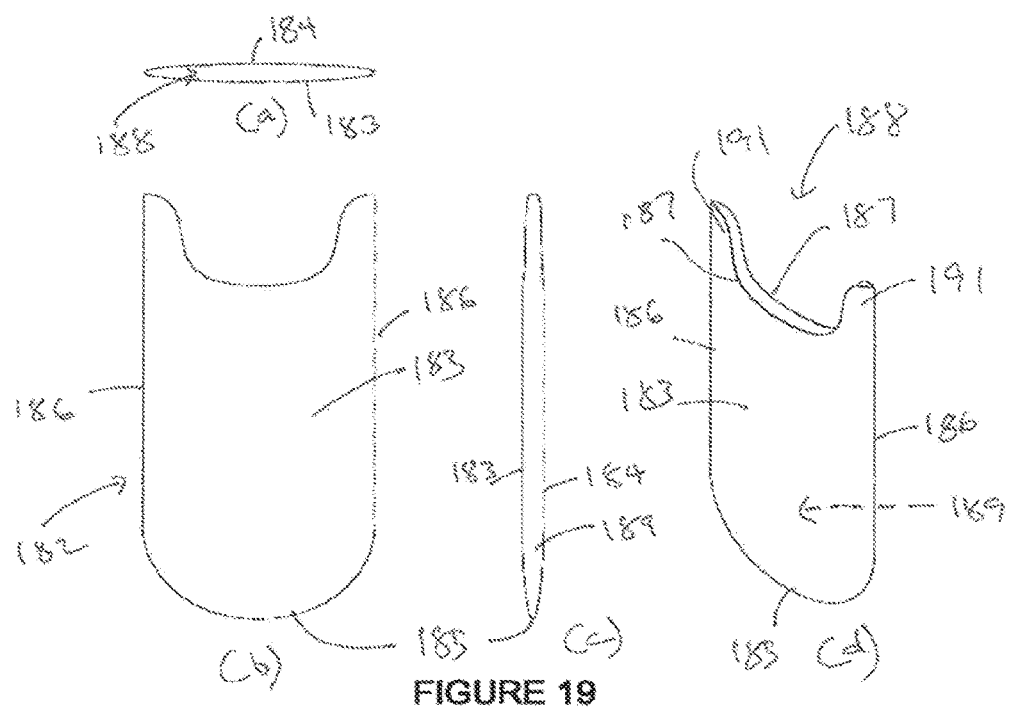
FIG. 19 shows the container of FIG. 18 where (a) is a top view, (b) is a front view, (c) is a side view, and (d) is a perspective view.

FIG. 18 shows a tissue box 300 and a container 180 according to another embodiment of the present invention. The container 180 is also attached or attachable to one wall 302 of the tissue box 300, such as a side or bottom wall thereof.

The container 180 comprises a main body 182 made from resilient latex material and comprises a first panel 183 and a second panel 184 joined along their bottom edge 185 and side edges 186. The top edges 187 of the panels 183 and 184 are not joined to each other and define an opening 188 of the main body 182 for accessing an internal space 189 thereof. The top edges 187 in this embodiment are generally U-shaped which forms handles 191 at the upper portions of the side edges 186. The handles 191 can be used for tying to each other to close the container opening 188 prior to disposal. In this embodiment, at least the opposing sections of the container 180, being the first panel 183 and the second panel 184 are resiliently biased towards each other to minimize the volume of the internal container space, and thus apply a compression force to its contents in use.

FIG. 20 shows a tissue box 300 and a container 200 according to another embodiment of the present invention. The container 200 comprises a rigid or semi-rigid insert 210 and a resilient flexible cover 220. In the embodiment, the insert 210 is made from cardboard and the cover 220 is made from resilient latex.

The insert 210 is a flat generally rectangular member having short edges 212 and long edges 213. The liner 210 includes a primary foldline 214 extending between the long edges 213 and located generally halfway between the short edges 212. The insert 210 also includes two secondary foldlines 215 which are substantially parallel to the primary foldline 214 and located at opposite sides thereof. The secondary foldlines 215 are substantially equally spaced from the primary foldline 214.

The foldlines 214 and 215 define side sections 216 of the insert 210 which respectively extend between a short edge 212 and a secondary foldline 215, and base sections 217 which respectively extend between one of the secondary foldlines 215 and the primary foldline 214.

FIGS. 20 (a) and 21 (c) show the insert 210 in its initial folded configuration, where the insert 210 is folded along the primary foldline 214 such that the side sections 216 and base sections 217 are substantially parallel, adjacent and facing each other. The short edges 212 each include semi-circle cutouts 218.

The cover 220 covers the external surfaces of the insert 210 but do not extend across the short edges 212. The cover 220 includes first and second panel portions 222 and 223 which are connected to each other along their lower edges 225 and their side edges via folded side panels 224. Upper edges 216 of the first and second panel portions 222 and 223 are not attached to each other and form a slit opening 217 for the container 200.

In this embodiment, the resilient cover 220 biases the opposing sections of the container 200, being the side sections 216 and the base sections 217, resiliently towards each other to minimize the volume of the internal container space 149, and thus apply a compression force to its contents in use.

In use, the user removes the container 200 from the tissue box 300 and pushes the lower edge 225 against a surface such as a table, which folds the base sections 217 relative to the side sections 216. The base sections 217 are folded toward the surface which effectively expands the container space 219. The base sections 217 in this embodiment are folded such that they are generally flat against the surface to form a generally flat container base. The side panels 224 are unfolded to provide the expansion to the expanded configuration of the container 200. The insert 210 is thus moved to a generally triangular configuration.

The folds 214 and 215 are preferably adapted such that the container 200 remains in the expanded configuration as desired on a surface, and when required, the container 200 can then be lifted from the surface and the folds 214 and 215 actuated at which the container 200 is substantially returned to its substantially flat folded configuration, which compresses the contents of the container space 219.

Figure 22:
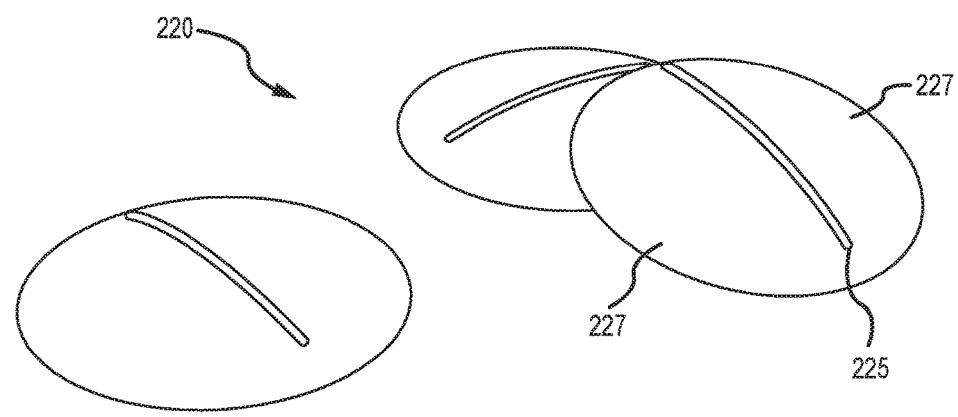
FIG. 22 is a perspective view of three containers in accordance with another preferred embodiment of the present invention.
Figure 23:
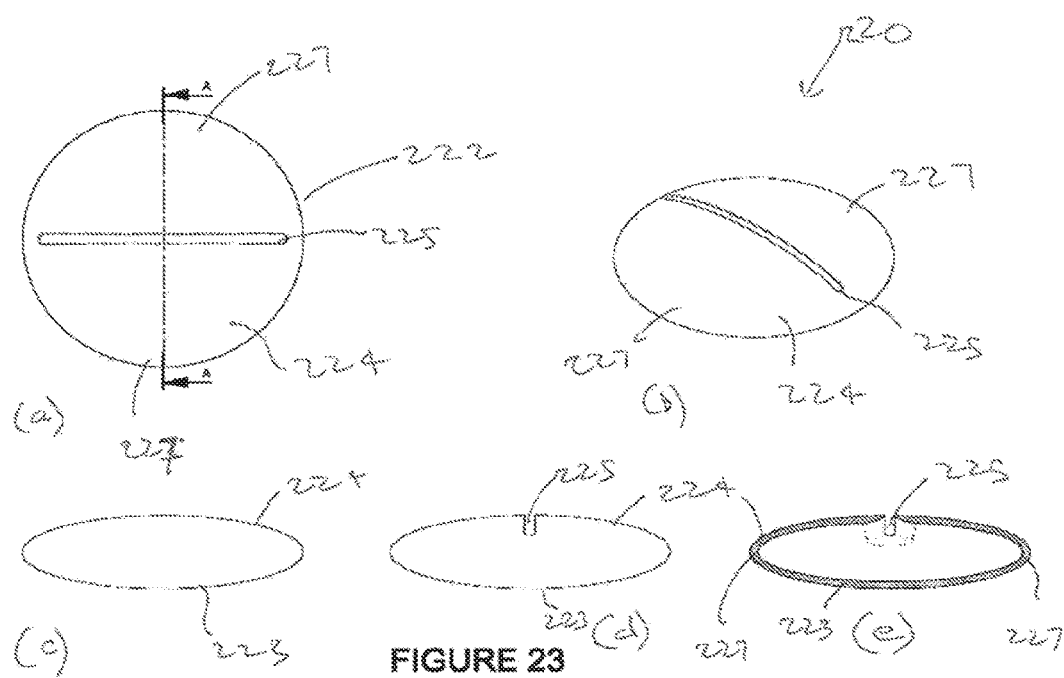
FIG. 23 shows one of the containers of FIG. 22 where (a) is a top view, (b) is a perspective view, (c) is an end view, (d) is a side view, and (e) is a cross-section view along line A-A.

FIGS. 22 and 23 show another embodiment of a container 220 according to the present invention. The container 220 is designed to be a reusable and is made from silicon rubber material or disposable and made from resilient latex material.

The container 220 comprises a generally flat, rounded pod-shaped body 222 having a closed lower portion 223 and an upper portion 224 which includes a slit opening 225. The body 222 defines an internal space 226, which is accessed by squeezing side edge portions 227 disposed on opposing sides of the opening 225 toward each other. This squeezing action deforms the body 222 and enlarges the opening 225. In this embodiment, at least the opposing sections of the container 220, being the lower portion 223 and the upper portion 224, are resiliently biased towards each other to minimize the volume of the internal container space, and thus apply a compression force to its contents in use.

Figure 24:
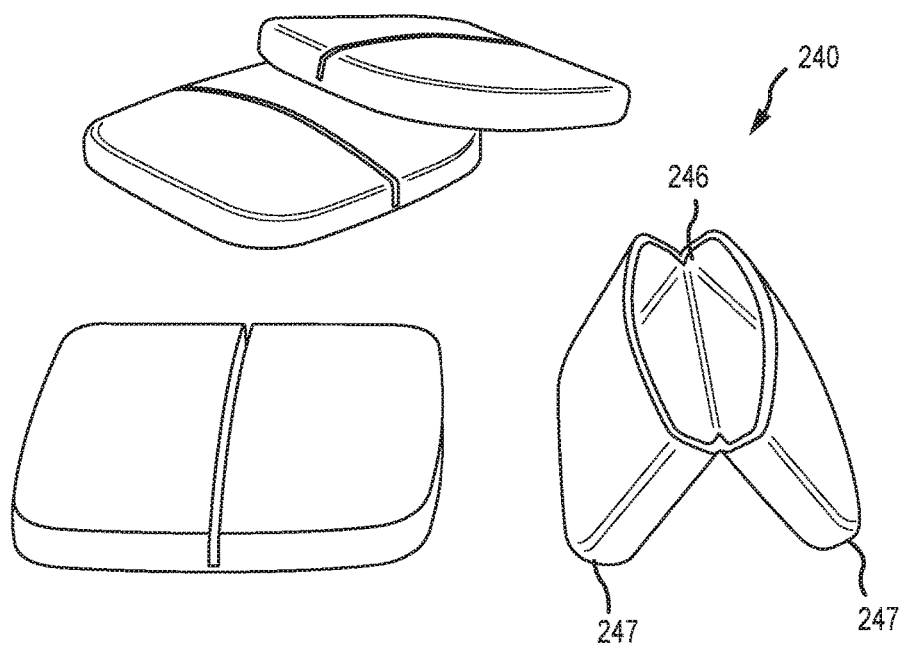
FIG. 24 is a perspective view of four containers in accordance with another preferred embodiment of the present invention, with one of the containers shown in the open configuration.
Figure 25:
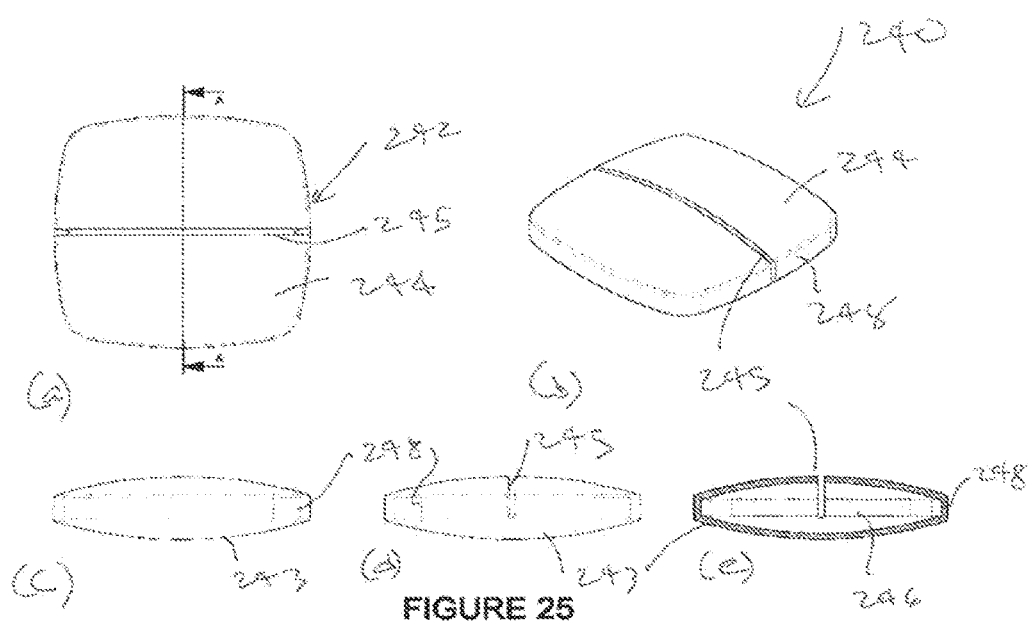
FIG. 25 shows one of the containers of FIG. 24 where (a) is a top view, (b) is a perspective view, (c) is an end view, (d) is a side view, and (e) is a cross-section view along line A-A.

FIGS. 24 and 25 show another embodiment of a container 240 according to the present invention, which is similar to the container 220. The container 240 is also designed to be a reusable and is made from silicon rubber material, or disposable and made from resilient latex material.

The container 240 comprises a generally flat, rectangular pod-shaped body 242 having a closed lower portion 243, a side wall 248, an upper portion 244 and a slit opening 245. The slit opening 245 extends along the side wall 248 and the upper portion 244. The body 242 defines an internal space 246, which is accessed by squeezing side edge portions 247 toward each other. The body 242 generally comprises two halves joined along an edge. In this embodiment, at least the opposing sections of the container 240, being the lower portion 243 and the upper portion 244, are resiliently biased towards each other to minimize the volume of the internal container space, and thus apply a compression force to its contents in use.

Figure 26:
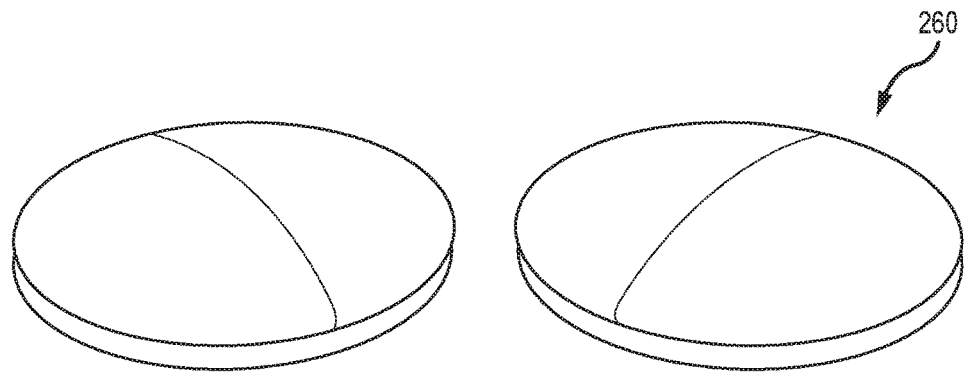
FIG. 26 is a perspective view of two containers in accordance with another preferred embodiment of the present invention.
Figure 27:
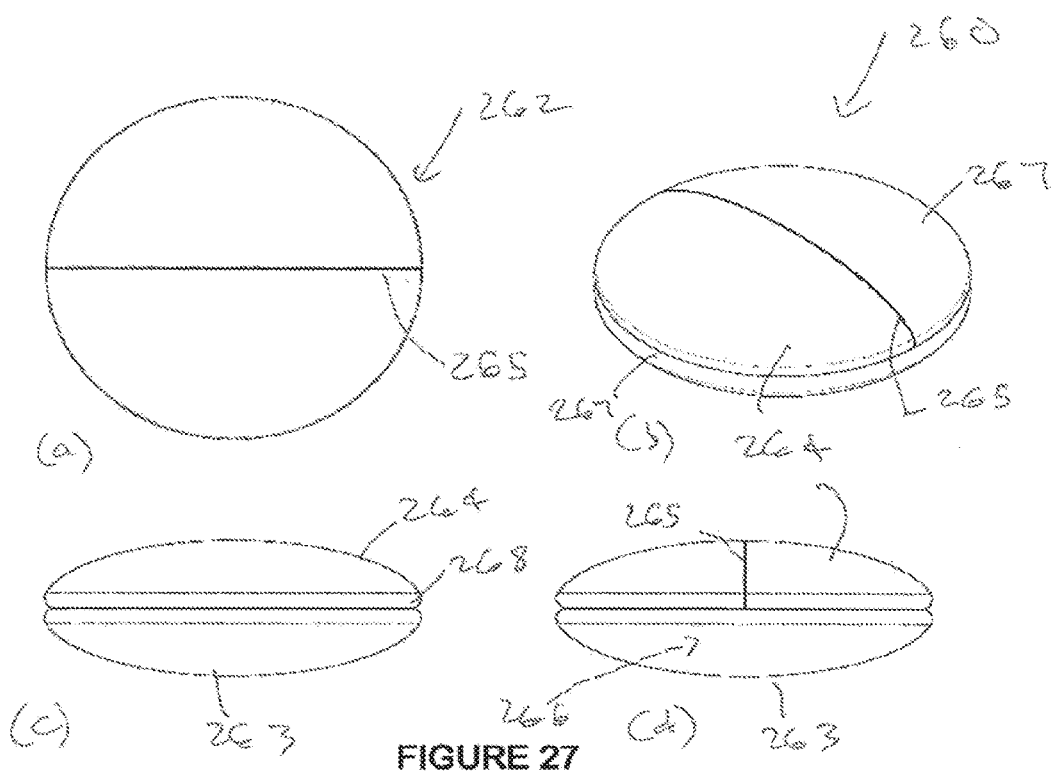
FIG. 27 shows one of the containers of FIG. 26 where (a) is a top view, (b) is a perspective view, (c) is an end view, and (d) is a side view.

FIGS. 26 and 27 show another embodiment of a container 260 according to the present invention, which is similar to the container 220. The container 240 is also designed to be a reusable and this embodiment is made from neoprene (wetsuit) material, or disposable and made from resilient latex material.

The container 260 comprises a generally flat, rounded pod-shaped body 262 having a closed lower portion 263, a side wall 268, an upper portion 264 and a slit opening 265. The slit opening 265 extends along the side wall 268 and the upper portion 264. The body 262 defines an internal space 266, which is accessed by squeezing side edge portions 267 toward each other. In this embodiment, at least the opposing sections of the container 260, being the lower portion 263 and the upper portion 264, are resiliently biased towards each other to minimize the volume of the internal container space, and thus apply a compression force to its contents in use.

The present container can be made in any size, and can be removably attached to pocket sized tissue dispensers.

Interpretation

Embodiments

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly it should be appreciated that in the above description of example embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description of Specific Embodiments are hereby expressly incorporated into this Detailed Description of Specific Embodiments, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

Different Instances of Objects

As used herein, unless otherwise specified the use of the ordinal adjectives "first", "second", "third", etc., to describe a common object, merely indicate that different instances of like objects are being referred to, and are not intended to imply that the objects so described must be in a given sequence, either temporally, spatially, in ranking, or in any other manner.

Specific Details

In the description provided herein, numerous specific details are set forth. However, it is understood that embodiments of the invention may be practiced without these specific details. In other instances, well-known methods, structures and techniques have not been shown in detail in order not to obscure an understanding of this description.

TERMINOLOGY

In describing the preferred embodiment of the invention illustrated in the drawings, specific terminology will be resorted to for the sake of clarity. However, the invention is not intended to be limited to the specific terms so selected, and it is to be understood that each specific term includes all technical equivalents which operate in a similar manner to accomplish a similar technical purpose. Terms such as "forward", "rearward", "radially", "peripherally", "upwardly", "downwardly", and the like are used as words of convenience to provide reference points and are not to be construed as limiting terms.

Comprising and Including

In the claims which follow and in the preceding description of the invention, except where the context requires otherwise due to express language or necessary implication, the word "comprise" or variations such as "comprises" or "comprising" are used in an inclusive sense, i.e. to specify the presence of the stated features but not to preclude the presence or addition of further features in various embodiments of the invention.

Any one of the terms: including or which includes or that includes as used herein is also an open term that also means including at least the elements/features that follow the term, but not excluding others. Thus, including is synonymous with and means comprising.

Scope of Invention

Thus, while there has been described what are believed to be the preferred embodiments of the invention, those skilled in the art will recognize that other and further modifications may be made thereto without departing from the spirit of the invention, and it is intended to claim all such changes and modifications as fall within the scope of the invention. For example, any formulas given above are merely representative of procedures that may be used. Functionality may be added or deleted from the block diagrams and operations may be interchanged among functional blocks. Steps may be added or deleted to methods described within the scope of the present invention.

Although the invention has been described with reference to specific examples, it will be appreciated by those skilled in the art that the invention may be embodied in many other forms.

INDUSTRIAL APPLICABILITY

It is apparent from the above, that the arrangements described are applicable to the consumer and cleaning industries.

The claims defining the invention are as follows:

1. A container comprising a body having a first section and an opposing second section that define an internal space and an opening in the first section, the container further comprising a flat liner having an aperture, wherein the flat liner is positioned in the internal space between the opposed first and second sections of the body, wherein at least a portion of the body is expandable such that at least a portion of the second section is moved away from the first section and the flat liner to form a container space between an interior side of the second section and a side of the flat liner that faces the second section, wherein the flat liner is positioned in the internal space such that the opening is aligned with the aperture and an item can be inserted through the opening to expand the at least the portion of the body such that the item is positioned within the container space formed between the interior side of the second section and the side of the flat liner that faces the second section, and wherein the second section and the flat liner are resiliently biased toward each other.

2. The container of claim 1 wherein the opening comprises a slit formed in the body.

3. The container of claim 1 wherein the body is generally disc shaped.

4. The container of claim 1 wherein the body is substantially flat.

5. The container of claim 1 wherein the first section comprises a first panel and the second section comprises a second panel wherein the first panel and the second panel are connected to each other substantially around their peripheral edges to define the internal space therebetween.

6. The container of claim 5 wherein the opening extends across the first panel.

7. The container of claim 5 wherein the first panel maintains a generally flat configuration.

8. The container of claim 1 wherein the container is made from one integral piece of material.

9. The container of claim 1 wherein the flat liner is generally disc shaped.

10. The container of claim 1 wherein the flat liner is made from a recycled or readily biodegradable material.

11. A container comprising:
 a body having a first panel and an opposing second panel that define an internal space;
 wherein the first panel includes an opening;
 wherein a user can insert at least one item into the internal space through the opening; and
 a flat liner disposed within the internal space between the first and second panels, the flat liner having an aperture;
 wherein the flat liner is positioned in the internal space between the opposed first and second panels of the body, wherein at least a portion of the body is expandable such that at least a portion of the second section is moved away from the first section and the flat liner to form that a container space between an interior side of the second section and a side of the flat liner that faces the second section, wherein the flat liner is positioned in the internal space such that the opening is aligned with the aperture and such that when the item is inserted through the opening it expands the at least the portion of the body such that the item is positioned within the container space formed between the interior side of the second panel and the side of the flat liner that faces the second section, and wherein the second panel and the flat liner are resiliently biased toward each other.

\* \* \* \* \*